(12) United States Patent
Chen et al.

(10) Patent No.: US 12,366,677 B2
(45) Date of Patent: Jul. 22, 2025

(54) COAL ROCK THREE-DIMENSIONAL STRAIN FIELD VISUAL SYSTEM AND METHOD UNDER MINING INFLUENCE

(71) Applicants: North China Institute Of Science And Technology, Beijing (CN); Chongqing University, Chongqing (CN)

(72) Inventors: Liang Chen, Beijing (CN); Quanle Zou, Zhenping County (CN); Zhiheng Cheng, Beijing (CN); Dahe Yan, Changtu County (CN); Jun Zhang, Beijing (CN); Han Liu, Wuhu (CN); Meichen Li, Jiaozuo (CN); Xiaofeng Xia, Weifang (CN); Yun Lu, Jinan (CN)

(73) Assignees: North China Institute Of Science And Technology, Beijing (CN); Chongqing University, Chongqing (CN)

( * ) Notice: Subject to any disclaimer, the term of this patent is extended or adjusted under 35 U.S.C. 154(b) by 1008 days.

(21) Appl. No.: 17/349,212

(22) Filed: Jun. 16, 2021

(65) Prior Publication Data

US 2021/0389500 A1    Dec. 16, 2021

(30) Foreign Application Priority Data

Jun. 16, 2020    (CN) .......................... 202010545996.X (51) Int. Cl.
*G01V 20/00*    (2024.01)
*B29C 64/10*    (2017.01)
(Continued)

(52) U.S. Cl.
CPC .............. *G01V 20/00* (2024.01); *B29C 64/10* (2017.08); *B33Y 80/00* (2014.12); *G01N 19/00* (2013.01);
(Continued)

(58) Field of Classification Search
CPC ................................ G01V 20/00; G01N 19/00
See application file for complete search history.

(56) References Cited

U.S. PATENT DOCUMENTS

| 11,747,246 | B2 * | 9/2023 | Cheng | .................... | B33Y 70/00 |
| | | | | | 73/865.6 |
| 2021/0390231 | A1 * | 12/2021 | Cheng | .................... | B33Y 10/00 |
| 2023/0154357 | A1 * | 5/2023 | Du | .......... | G09B 25/02 |
| | | | | | 434/390 |

FOREIGN PATENT DOCUMENTS

| CN | 105093962 A | * | 11/2015 |
| CN | 106405045 A | *  | 2/2017 |

(Continued)

*Primary Examiner* — Natalie Huls (57) ABSTRACT

Coal rock three-dimensional strain field visual system and method are provided under mining influence. The system includes a stress condition simulation system and a strain monitoring system. The stress condition simulation system includes a similar simulation experiment rack, a loading system and a circular slideway. The method includes preparing a 3D printing wire, printing a strain visual similar model, simulating a stratum dip angle and a gas-containing condition, applying stress fields, recording a cracking and dyeing condition of microcapsules inside the model, and the like. The system can realize tracing the generation and development of internal cracks in simulation models with complex geological conditions, and tracing the three-dimensional movement of internal ink dots to draw four-dimensional images of displacement fields.

3 Claims, 4 Drawing Sheets

(51) Int. Cl.

| | |
|---|---|
| *B33Y 80/00* | (2015.01) |
| *G01N 19/00* | (2006.01) |
| *G06F 30/20* | (2020.01) |
| *G06Q 50/02* | (2024.01) |
| *G09B 23/40* | (2006.01) |
| *B33Y 10/00* | (2015.01) |
| *G06F 119/14* | (2020.01) |

(52) U.S. Cl.
CPC ............. *G06F 30/20* (2020.01); *G06Q 50/02* (2013.01); *G09B 23/40* (2013.01); *B33Y 10/00* (2014.12); *G06F 2119/14* (2020.01)

(56) References Cited

FOREIGN PATENT DOCUMENTS

| CN | 107063970 | A | * | 8/2017 | ......... G01N 15/0826 |
|---|---|---|---|---|---|
| CN | 206788164 | U | * | 12/2017 | |
| CN | 206945684 | U | * | 1/2018 | |
| CN | 108398321 | A | * | 8/2018 | |
| CN | 208155714 | U | * | 11/2018 | ............... G01N 3/00 |
| CN | 208313974 | U | * | 1/2019 | ............. G01N 33/24 |

* cited by examiner

COAL ROCK THREE-DIMENSIONAL STRAIN FIELD VISUAL SYSTEM AND METHOD UNDER MINING INFLUENCE

TECHNICAL FIELD OF THE INVENTION

The invention relates to the field of machinery and mine technology engineering, in particular to a coal rock three-dimensional strain field visual system and method under mining influence.

BACKGROUND OF THE INVENTION

As an important research method of rock stratum control technology, similar simulation experiment has been widely accepted and recognized. However, in the traditional similar simulation experiment, it is impossible to observe the internal strain field distribution of the materials visually rather than an indirect measuring method, thereby causing greater errors, destroying the integrity of the model and generating unnecessary errors. By constructing the model from a transparent microcapsule composite material, the strain field distribution inside the model can be visually observed in real time without destroying the integrity of the model. At present, 3D printing technology has been widely used to construct the model; by improving the shortcomings that the conventional model manufacturing method has difficulty in avoiding applying stress to the material and easily damages the internal microcapsules of the composite material, the 3D printing technology has advantages of being quick in forming, precise, free of prestress, and the like, and has a wide application prospect in similar simulation tests.

Therefore, it is urgent to develop a coal rock strain field visual system under mining influence.

SUMMARY OF THE INVENTION

The objective of the invention is to provide a coal rock three-dimensional strain field visual system and method under mining influence to solve the problems existing in the prior art.

The technical solution adopted to achieve the objective of the present invention is as follows: a coal rock three-dimensional strain field visual system under mining influence includes a stress condition simulation system, a coal seam mining simulation device and a strain monitoring system.

The stress condition simulation system includes a similar simulation experiment rack, a loading system and a circular slideway.

The similar simulation experiment rack includes a press chamber and two visual side plates. The pressure chamber is a rectangular frame body as a whole. The two open ends of the rectangular frame body can be sealed by the visual side plates. Gas tube extending-out holes are formed in the plate surfaces of the visual side plates. The pressure chamber and the visual side plates are enclosed to define a stratum similar model placing cavity.

The loading system includes a vertical axial pressure loading system and a horizontal stress loading system. The vertical axial pressure loading system loads set vertical loading force to the top and the bottom of the pressure chamber. The horizontal stress loading system loads set horizontal loading force to the left side of the pressure chamber.

The coal seam mining simulation device includes a plurality of attached gasbags and a gas pressure loading device.

Each attached gasbag is a rectangular cushion body formed by splicing several single gasbags. The attached gasbags are embedded into the stratum similar model to simulate a coal seam. A gas valve is arranged on each single gasbag. The gas valve is connected to a gas tube.

The gas tube extends out of a gas tube extending-out hole and communicates with the gas pressure loading device.

The strain monitoring system includes a plurality of multi-angle high-speed cameras.

In work, the loading system applies vertical load and lateral load to the stratum similar model to simulate a stress state of a coal rock layer. The gas pressure loading device exhausts the gas in the single gasbag to simulate coal seam mining Coal beam mining is ended if gas in the single gasbags of the attached gasbags is discharged.

Furthermore, a single-coal-beam and multi-coal-beam mining condition is simulated by adjusting number of the attached gasbags. A ground stress condition of different buried to-be-mined coal seams is simulated by adjusting gas pressure of the attached gasbags.

Furthermore, gas injected into the attached gasbags is nitrogen gas.

Furthermore, a pressure stabilizing device is further arranged between single gasbags and the gas pressure loading device.

The invention further discloses a coal rock three-dimensional strain field visual method under mining influence adopting the system, including the following steps:
1) heating and melting a transparent base material to uniformly mix with the ink microcapsules to prepare a 3D printing wire;
2) performing geological structure 3D printing in the model placing cavity of the stress condition simulation system to obtain a strain visual similar model;
3) utilizing the stress condition simulation system to simulate a stratum dip angle, a geological structure and a gas-containing situation, and according to the similarity, filling nitrogen gas with certain pressure into attached gasbags of the coal seam mining simulation device to simulate a coal seam to be mined;
4) after the model is cooled, applying three-dimensional stress to the model, and utilizing an exhaust valve to sequentially exhaust the nitrogen in the attached gasbags to simulate a coal seam pressure relief process, where the ink microcapsules are broken under the stress to dye the surrounding materials and cracks;
5) utilizing a multi-angle high-speed camera to record the cracking and dyeing condition of microcapsules inside the model; and
6) tracking the displacement of the ink dots after the microcapsules are cracked, and reconstructing the four-dimensional strain fields in the monitoring model;

Furthermore, the capsule walls of the ink microcapsules are made of a polyurethane material, and the capsule cores are made of dying ink. The transparent base material is silicone resin.

Furthermore, in the step 2), mica powder is used to separate the layers of similar model rock layers.

Furthermore, in the step 3), after the model is fixed on the experiment rack, the experiment rack can be rotated through the circular slideway to adjust the angle to simulate the stratum dip angle.

The technical effects of the invention are beyond doubt:
A, the generation and development of internal cracks in simulation models with similar geological conditions can be traced, and the three-dimensional movement of internal ink dots can be traced to draw four-dimensional images of displacement fields;

B, Strain visualization makes the division of the stress action range clearer, and the action effect more significant. Compared with the traditional model, the strain visual model more clearly reflects the action effect of the force in the model, and avoids destroying the completeness of the model for arranging the stress sensor;

C, the 3D printing construction model avoids excessive cracking of the microcapsules during the modeling process;

D, the multi-angle high-speed camera unit solves the defects that a single camera cannot form stereo vision and cannot draw three-dimensional images;

E, the system can be used to trace the formation and development of cracks under stress; and F, the system can be used to analyze the four-dimensional distribution of the displacement fields in the model under stress.

In the figures: similar simulation experiment frame 1, pressure chamber 101, visual side plate 102, gas tube extending-out hole 1021, loading system 2, circular slideway 3, attached gasbag 4, single airbag 401, gas pressure loading device 5 and pressure stabilizing device 6.

DETAILED DESCRIPTION OF THE PREFERRED EMBODIMENTS

The invention will be further described below in conjunction with embodiments, but it should not be understood that the scope of the above subject matter of the present invention is limited to the following embodiments. Without departing from the above technical idea of the invention, various substitutions and changes based on common technical knowledge and conventional means in the field should be included in the protection scope of the invention.

Embodiment 1

Refer to FIG. 1 to FIG. 5, the embodiment of the invention discloses a coal rock three-dimensional strain field visual system under mining influence, including a stress condition simulation system, a coal seam mining simulation device and a strain monitoring system.

Figure 1:
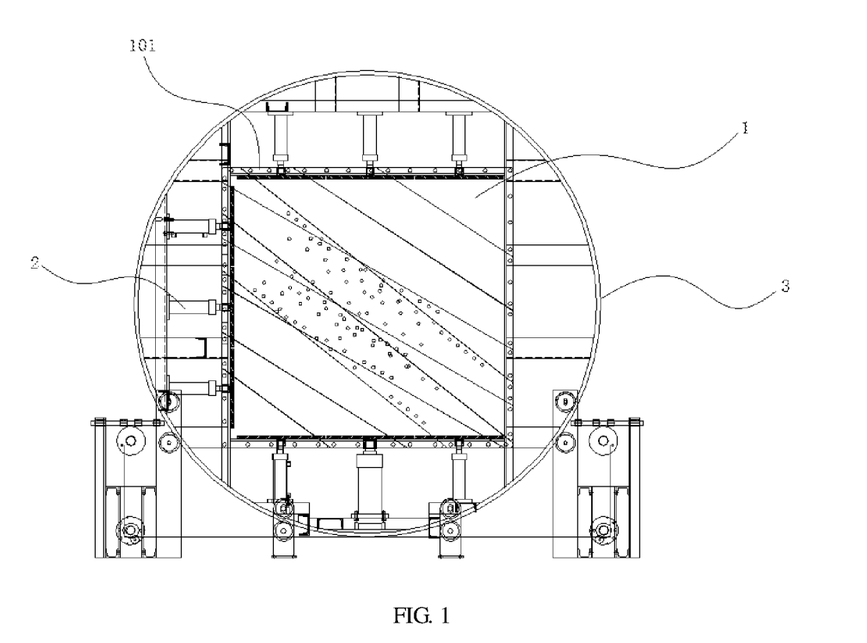
FIG. 1 is a schematic diagram showing the structure of a stress condition simulation system.
Figure 2:
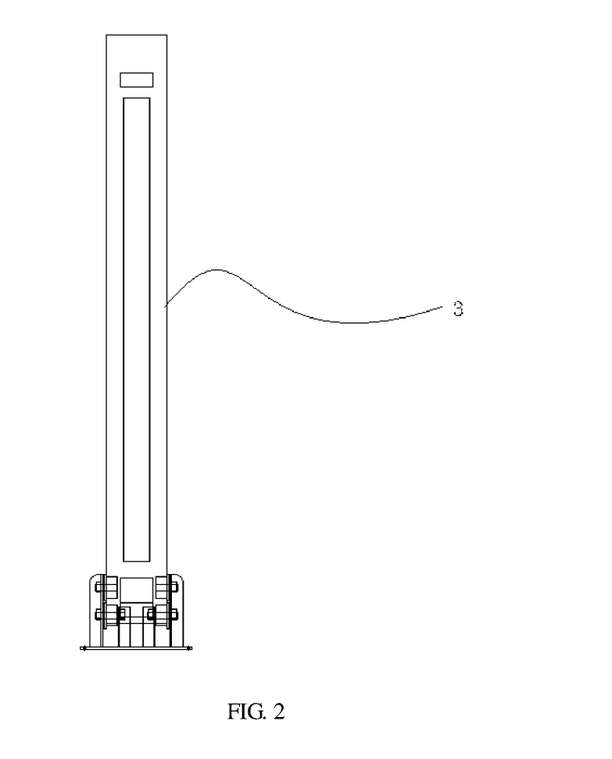
FIG. 2 is a side view of the stress condition simulation system.

The stress condition simulation system includes a similar simulation experiment rack 1, a loading system 2 and a circular slideway 3.

Figure 3:
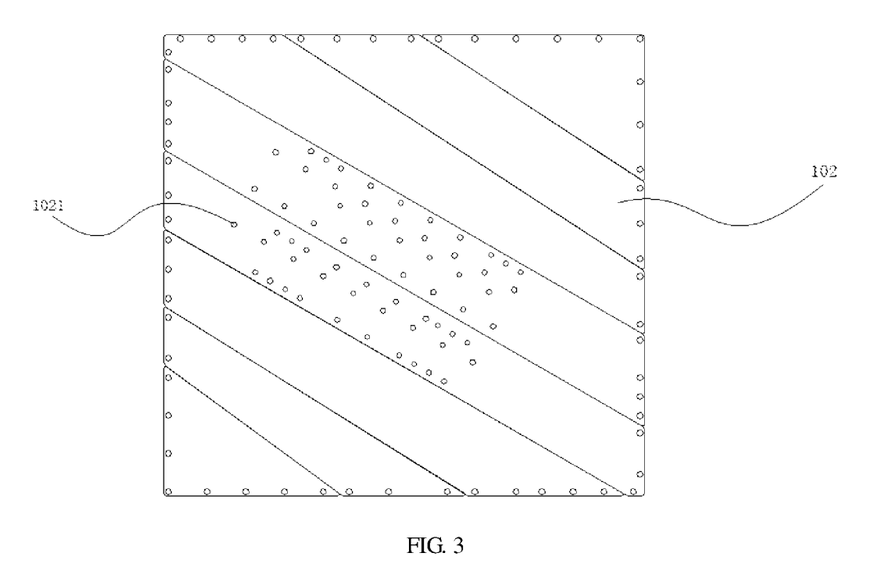
FIG. 3 is a schematic diagram showing the structure of a visual side plate.

The similar simulation experiment rack 1 includes a press chamber 101 and two visual side plates 102. The pressure chamber 101 is a rectangular frame body as a whole. The two open ends of the rectangular frame body can be sealed by the visual side plates 102. Gas tube extending-out holes 1021 are formed in the plate surfaces of the visual side plates 102. The pressure chamber 101 and the visual side plates 102 are enclosed to define a formation similar model placing cavity.

The loading system 2 includes a vertical axial pressure loading system and a horizontal stress loading system. The vertical axial pressure loading system loads set vertical loading force to the top and the bottom of the pressure chamber 101. The horizontal stress loading system loads set horizontal loading force to the left side of the pressure chamber 101.

Figure 4:
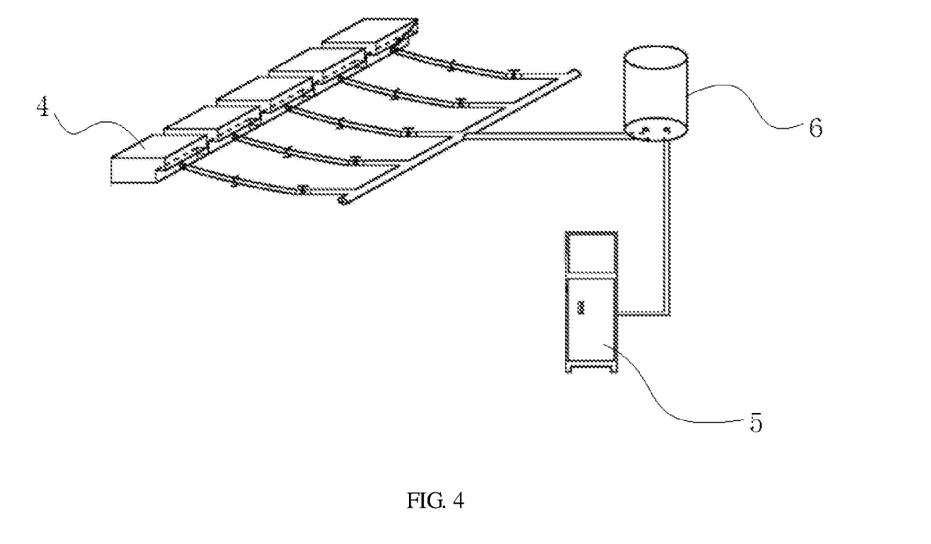
FIG. 4 is diagram showing the connection relationship of attached gasbags.
Figure 5:
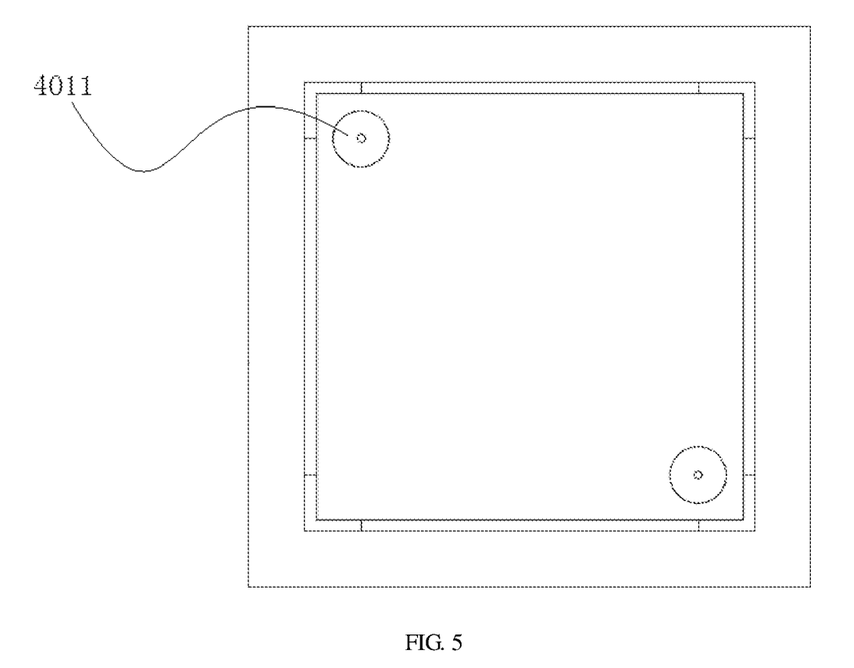
FIG. 5 is a schematic diagram showing the structure of a single gasbag.

The coal seam mining simulation device includes a plurality of attached gasbags 4 and a gas pressure loading device 5. Each attached gasbag 4 is a rectangular cushion body formed by splicing several single gasbags 401. The attached gasbags 4 are embedded into the formation similar model to simulate a coal seam. A gas valve 4011 is arranged on each single gasbag 401. The gas valve 4011 is connected to a gas tube. The gas tube extends out of a gas tube extending-out hole 1021 and communicates with the gas pressure loading device 5. A pressure stabilizing device 6 is further arranged between single gasbags 401 and the gas pressure loading device 5. The number of the single gasbags 401 is determined according to the length of the model. The dimensions of the single gasbags 401 provide various specifications to simulate coal seams with different thicknesses.

The strain monitoring system includes a plurality of multi-angle high-speed cameras.

In work, the loading system 2 applies vertical load and lateral load to the stratum similar model to simulate a stress state of a coal rock layer. After the model is fixed on the experiment rack, the experiment rack can rotate by the circular slideway to adjust the angle to simulate the stratum dip angle. The gas pressure loading device 5 exhausts the gas in the single gasbag 401 to simulate coal seam mining Coal beam mining is ended if gas in the single gasbags 401 of the attached gasbags 4 is discharged.

Embodiment 2

Figure 6:
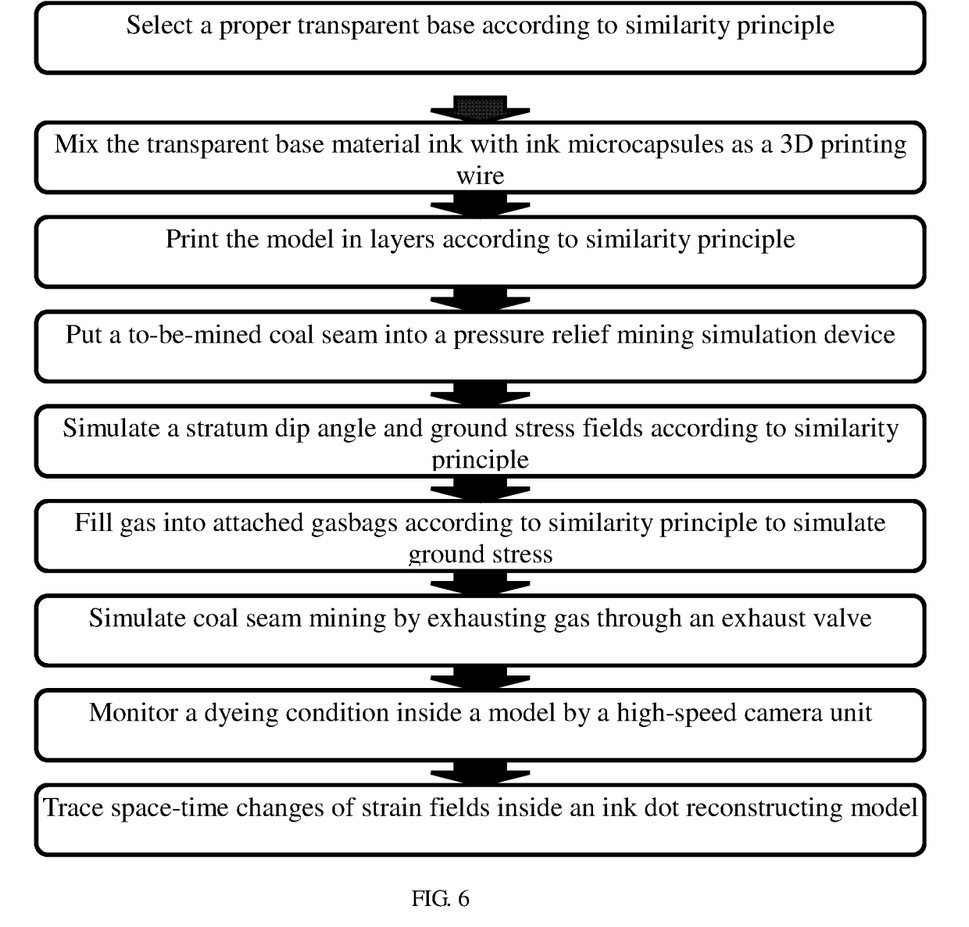
FIG. 6 is a flowchart of a method.

Refer to FIG. 6, the embodiment of the invention disclosed a coal rock three-dimensional strain field visual method under mining influence adopting the system of the Embodiment 1, including the following steps that:

1) a transparent base material was heated and melted to uniformly mix with the ink microcapsules to prepare a 3D printing wire;
2) geological structure 3D printing was performed in the model placing cavity of the stress condition simulation system to obtain a strain visual similar model;
3), the stress condition simulation system was utilized to simulate a stratum dip angle, a geological structure and a gas-containing situation, and the experiment rack was rotated by the circular slideway to adjust the angle to simulate the stratum dip angle after the model was fixed onto the experiment rack, and according to the similarity, nitrogen gas was filled with certain pressure into attached gasbags of the coal seam mining simulation device to simulate a coal seam to be mined;
4) after the model was cooled, three-dimensional stress was applied to the model, and an exhaust valve was utilized to sequentially exhaust the nitrogen gas in the attached gasbags to simulate a coal seam pressure relief mining process, where the ink microcapsules were broken under the stress to dye the surrounding materials and cracks;

5) a multi-angle high-speed camera was utilized to record the cracking and dyeing condition of microcapsules inside the model; and
6) the displacement of the ink dots was traced after the microcapsules were cracked, and the four-dimensional strain fields were reconstructed in the monitoring model.

Embodiment 3

The embodiment of the invention further disclosed a coal rock three-dimensional strain field visual method under single-coal-seam mining influence, including the following step:
1) a transparent base material was heated and melted to uniformly mix with the ink microcapsules to prepare a 3D printing wire, where capsule walls of the ink microcapsules were made of a polyurethane material, and the capsule cores were made of dying ink; the transparent base material was silicone resin.
in this embodiment, the ink microcapsules were synthesized by a chemical method; the chemical method, also known as an in-situ polymerization method, referred to a series of reaction conditions such as adjusting the temperature of a reaction system, adjusting the pH value or adding electrolytes, catalysts, etc., so that small monomer molecules were polymerized to form polymer film-forming materials and precipitated from the solution to cover the core material; in the entire reaction system, the core material was dispersed into fine particles through mechanical stirring and emulsification, and the polymerization reaction proceeded on the surfaces of the core material droplets; at the beginning of the reaction, monomers X and Y were first pre-polymerized; as the thermal curing crosslinking reaction proceeded, -(X-Y)-n was the polymer capsule wall finally formed, and finally, the core material and the wall material were polymerized to form microcapsules; the microcapsules prepared by this method had a high film-forming rate and relatively stable properties;
It should be noted that the thickness of the capsule walls should be moderate, which can not only withstand the pressure brought by the molding process of the matrix material, but also feel the force brought by the crack extension; and the hardness of the capsules that can be broken in time under the stress cannot be too great, so that cracks can pass through rather than get across the cracks. the inner cores of the microcapsules had a suitable dyeing effect which could be observed by slight crushing, and the more crushing, the deeper the dyeing; and the melting points of the capsule walls were higher than the melting point of the base material to prevent the microcapsule walls from dissolving and leaking out during the mixing process and printing process.
2) According to the similarity, geological structure 3D printing was performed on different stratums in the model placing cavity of the stress condition simulation system; the coal seam mining simulation device was embedded into the coal seam position to be mined to obtain a matrix transparent strain visual similar model;
3) the stress condition simulation system was utilized to simulate a stratum dip angle, a geological structure and a gas-containing situation, and the experiment rack was rotated by the circular slideway to adjust the angle to simulate the stratum dip angle after the model was fixed onto the experiment rack, and according to the similarity, nitrogen gas was filled with certain pressure into attached gasbags of the coal seam mining simulation device to simulate a coal seam to be mined;
4) after the model was cooled, three-dimensional stress was applied to the model, and an exhaust valve was utilized to sequentially exhaust the nitrogen gas in the attached gasbags to simulate a coal seam pressure relief mining process, where the ink microcapsules were broken under the stress to dye the surrounding materials and cracks;
5) a multi-angle high-speed camera was utilized to record the cracking and dyeing condition of microcapsules inside the model, where the crack fields of the material could also be restored by tracing and monitoring cracked dyed points; the evolution of cracks can be obtained by using high-speed cameras to observe similar models as the stress increased and the process of crack initiation and expansion was combined with fractal theory to obtain the evolution law of mining cracks; the evolution law of mining cracks included the evolution of the number, opening degree, area, type and fractal dimension of mining cracks as the mining proceeded; the position of the ink dot was traced after cracking, and plus the time axis, could draw a four-dimensional displacement field distribution image in the model;
multiple multi-angle high-speed camera units were utilized to trace the expansion of the microcapsule dyed area, so that the spread of the instantaneous crack fields in the three-dimensional space could be obtained; the three-dimensional stress freezing technology was used to extract the stress fields at different slices and then combine the stress changes in different excavation processes to perform four-dimensional reconstruction to obtain the four-dimensional strain distribution in the model; the position changes of the ink dot were traced after cracking to obtain four-dimensional displacement field distribution in the model;
6) the displacement of the ink dots was traced after the microcapsules were cracked, and the four-dimensional strain fields were reconstructed in the monitoring model,
By combining the microcapsule composite material, the 3D printing technology, the similar simulation system and the multi-angle high-speed camera unit in this embodiment, the generation and development of internal cracks in simulation models with similar geological conditions could be traced, and the three-dimensional movement of internal ink dots could be traced to draw four-dimensional images of displacement fields;
it should be noted that under the action of the static stress fields, the microcapsule cracked dyed area was the distribution area of the stress fields greater than the microcapsule crack threshold; the denser the microcapsule cracks the deeper the dyeing and the greater the stress.

Embodiment 4

The embodiment of the invention further disclosed a coal rock three-dimensional strain field visual method under multi-coal-seam mining influence, including the following steps:
1) a transparent base material was heated and melted to uniformly mix with the ink microcapsules to prepare a 3D printing wire, where capsule walls of the ink microcapsules were made of a polyurethane material, and the capsule cores were made of dying ink; the transparent base material was silicone resin;

in this embodiment, the ink microcapsules were synthesized by a chemical method; the chemical method, also known as an in-situ polymerization method, referred to a series of reaction conditions such as adjusting the temperature of a reaction system, adjusting the pH value or adding electrolytes, catalysts, etc., so that small monomer molecules were polymerized to form polymer film-forming materials and precipitated from the solution to cover the core material; in the entire reaction system, the core material was dispersed into fine particles through mechanical stirring and emulsification, and the polymerization reaction proceeded on the surfaces of the core material droplets; at the beginning of the reaction, monomers X and Y were first pre-polymerized; as the thermal curing crosslinking reaction proceeded, -(X-Y)-n was the polymer capsule wall finally formed, and finally, the core material and the wall material were polymerized to form microcapsules; the microcapsules prepared by this method had a high film-forming rate and relatively stable properties;

It should be noted that the thickness of the capsule walls should be moderate, which can not only withstand the pressure brought by the molding process of the matrix material, but also feel the force brought by the crack extension; and the hardness of the capsules that can be broken in time under the stress cannot be too great, so that cracks can pass through rather than get across. the inner cores of the microcapsules had a suitable dyeing effect which could be observed by slight crushing, and the more crushing, the deeper the dyeing; and the melting points of the capsule walls were higher than the melting point of the base material to prevent the microcapsule walls from dissolving and leaking out during the mixing process and printing process.

2) According to the similarity, geological structure 3D printing was performed on different stratums in the model placing cavity of the stress condition simulation system; the coal seam mining simulation device was embedded into the coal seam position to be mined to obtain a matrix transparent strain visual similar model by adjusting the number and the dimension specification of the attached gasbags according to different coal seam conditions to simulate the multi-coal-seam condition.

3) the stress condition simulation system was utilized to simulate a stratum dip angle, a geological structure and a gas-containing situation, and the experiment rack was rotated by the circular slideway to adjust the angle to simulate the stratum dip angle after the model was fixed onto the experiment rack, and according to the similarity, nitrogen gas was filled with certain pressure into attached gasbags of the coal seam mining simulation device to simulate a coal seam to be mined; gas of different gas pressures was punched into coal seams at different lengths to simulate a ground stress condition at different coal seams.

4) after the model was cooled, three-dimensional stress was applied to the model, and an exhaust valve was utilized to sequentially exhaust the nitrogen gas in the attached gasbags to simulate a coal seam pressure relief mining process, where the ink microcapsules were broken under the stress to dye the surrounding materials and cracks;

the ink microcapsules were broken under the stress to dye the surrounding materials and cracks; a multi-angle high-speed camera was utilized to record the cracking and dyeing condition of microcapsules inside the model; the crack fields of the material could also be restored by tracing and monitoring cracked dyed points; the evolution of cracks can be obtained by using high-speed cameras to observe similar models as the stress increased and the process of crack initiation and expansion was combined with fractal theory to obtain the evolution law of mining cracks; the evolution law of mining cracks included the evolution of the number, opening degree, area, type and fractal dimension of mining cracks as the mining proceeded; the position of the ink dot was traced after cracking, and plus the time axis, could draw a four-dimensional displacement field distribution image in the model;

multiple multi-angle high-speed camera units were utilized to trace the expansion of the microcapsule dyed area, so that the spread of the instantaneous crack fields in the three-dimensional space could be obtained; the three-dimensional stress freezing technology was used to extract the stress fields at different slices and then combine the stress changes in different excavation processes to perform four-dimensional reconstruction to obtain the four-dimensional strain distribution in the model; and the position changes of the ink dot were traced after cracking to obtain four-dimensional displacement field distribution in the model;

6) the displacement of the ink dots was traced after the microcapsules were cracked, and the four-dimensional strain fields were reconstructed in the monitoring model, where by combining the microcapsule composite material, the 3D printing technology, the similar simulation system and the multi-angle high-speed camera unit in this embodiment, the generation and development of internal cracks in simulation models with similar geological conditions could be traced, and the three-dimensional movement of internal ink dots could be traced to draw four-dimensional images of displacement fields.

What is claimed is:

1. A coal rock three-dimensional strain field visual method under mining influence adopting a coal rock three-dimensional strain field visual system under mining influence, wherein the method comprising the following steps:

1) heating and melting a transparent base material to uniformly mix with ink microcapsules to prepare a 3D printing wire;

2) performing geological structure 3D printing in a model placing cavity of a stress condition simulation system to obtain a strain visual model;

3) utilizing the stress condition simulation system to simulate a stratum dip angle, a geological structure and a gas-containing situation, and filling nitrogen gas with certain pressure into attached gasbags of a coal seam mining simulation device to simulate a coal seam to be mined;

4) after the model is cooled, applying three-dimensional stress to the strain visual model, and utilizing an exhaust valve to sequentially exhaust the nitrogen gas in the attached gasbags to simulate a coal seam pressure relief mining process, wherein the ink microcapsules are broken under the stress to dye surrounding materials and cracks;

5) Utilizing a multi-angle high speed camera to record a cracking and dyeing condition of the ink microcapsules inside a stratum model; and 6) tracing a displacement of ink dots after the ink microcapsules are cracked, and reconstructing four-dimensional strain fields in the strain visual model and the stratum model, wherein the coal rock three-dimensional strain field visual system under mining influence, comprises: the stress condition simulation system; the coal seam mining simulation device;

and a strain monitoring system, wherein the stress condition simulation system comprises a simulation experiment rack (1), a loading system (2) and a circular slideway (3); the simulation experiment rack (1) comprises a pressure chamber (101) and two visual side plates (102); the pressure chamber (101) is a rectangular frame body as a whole; the rectangular frame body having two open ends sealed by the visual side plates (102); gas tube extending-out holes (1021) are formed in the plate surfaces of the visual side plates (102); the pressure chamber (101) and the visual side plates (102) are enclosed to define the model placing cavity;

the loading system (2) comprises a vertical axial pressure loading system and a horizontal stress loading system, the vertical axial pressure loading system loads set vertical loading force to the top and the bottom of the pressure chamber (101); the horizontal stress loading system loads set horizontal loading force to the left side of the pressure chamber (101);

the coal seam mining simulation device comprises a plurality of attached gasbags (4) and a gas pressure loading device (5); each attached gasbag (4) is a rectangular cushion body formed by splicing several single gasbags (401); the attached gasbags (4) are embedded into a stratum model to simulate a coal seam; a gas valve (4011) is arranged on each single gasbag (401); the gas valve (4011) is connected to a gas tube; the gas tube extends out of a gas tube extending-out hole (1021) and communicates with the gas pressure loading device (5); and the strain monitoring system comprises a plurality of multi-angle high-speed cameras; in work, the loading system (2) applies vertical load and lateral load to the stratum model to simulate a stress state of a coal rock layer; the gas pressure loading device (5) exhausts the gas in each of the single gasbags (401) to simulate coal seam mining; and the coal seam mining is ended if the gas in the single gasbags (401) of the plurality of attached gasbags (4) is discharged, wherein the stratum model is fixed on the simulation experiment rack (1), and the simulation experiment rack (1) is configured to be rotated using the circular slideway (3), to simulate the stratum dip angle, wherein each of the plurality of multi-angle high-speed cameras is configured to record the cracking and dyeing condition of microcapsules inside the stratum model, and the displacement of ink dots is traced based on cracking of the microcapsules to reconstruct four-dimensional fields in a strain visual model and the stratum model.

2. The coal rock three-dimensional strain field visual method under mining influence according to claim 1, wherein capsule walls of the ink microcapsules are made of a polyurethane material, and capsule cores are made of dying ink; and the transparent base material is silicone resin.

3. The coal rock three-dimensional strain field visual method under mining influence according to claim 1, wherein in the step 2), mica powder is used to separate layers of the strain visual model.

\* \* \* \* \*